(12) United States Patent
Sounderrajan

(10) Patent No.: US 12,730,873 B2
(45) Date of Patent: Sep. 8, 2026

(54) DYNAMIC ACCESS TO SERVICE DEVICES TO FACILITATE SECURE OPERATIONS

(71) Applicant: Truist Bank, Charlotte, NC (US)

(72) Inventor: Sunitha Sounderrajan, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 42 days.

(21) Appl. No.: 18/680,475

(22) Filed: May 31, 2024

(65) Prior Publication Data

US 2025/0371125 A1 Dec. 4, 2025

Related U.S. Application Data

(63) Continuation of application No. 18/680,279, filed on May 31, 2024.

(51) Int. Cl.

| | |
|---|---|
| ***G06F 21/36*** | (2013.01) |
| ***G06K 7/14*** | (2006.01) |
| ***G16Y 40/35*** | (2020.01) |
| ***H04L 9/40*** | (2022.01) |

(52) U.S. Cl.

CPC ........... *G06F 21/36* (2013.01); *G06K 7/1417* (2013.01); *G06K 7/1443* (2013.01); *G16Y 40/35* (2020.01); *H04L 63/083* (2013.01)

(58) Field of Classification Search

CPC ............................... G06F 21/36; G16Y 40/35

See application file for complete search history.

(56) References Cited

U.S. PATENT DOCUMENTS

2019/0156444 A1* 5/2019 Targownik ........... G06Q 50/163
2022/0400105 A1* 12/2022 Nouaille ............. H04L 63/0435
2023/0273968 A1* 8/2023 Ando .................. G06F 16/9566 707/769
2023/0278828 A1* 9/2023 Chen ....................... B66B 1/468 187/380
2024/0062601 A1* 2/2024 Corder ............... G07C 9/00896
2024/0378570 A1* 11/2024 Steele, III ............. G06Q 10/20

* cited by examiner

*Primary Examiner* — Chris Parry
*Assistant Examiner* — Abderrahmen Chouat
(74) *Attorney, Agent, or Firm* — Kilpatrick Townsend & Stockton LLP; Michael A. Springs, Esq.

(57) ABSTRACT

A system can be provided that can enable contactless access to service devices to facilitate secure transactions. For example, the system can include Internet of Things (IoT) service devices associated with a service provider. The system can also include a computing environment, which may receive an access request from a mobile device. The access request can be transmitted in response to a user of the mobile device performing a contactless authentication process with an IoT service device. The computing environment can then identify the IoT service device and can identify a user account associated with the mobile device and with the service provider. The computing environment can further provide access for the mobile device to functions of the IoT service device via a software application associated with the service provider. The functions can be used to facilitate secure transactions between the IoT service device and the user account.

19 Claims, 5 Drawing Sheets

DYNAMIC ACCESS TO SERVICE DEVICES TO FACILITATE SECURE OPERATIONS

CROSS-REFERENCE TO RELATED APPLICATIONS

The present application is a continuation of U.S. patent application Ser. No. 18/680,279, filed May 31, 2024, titled "DYNAMIC ACCESS TO SERVICE DEVICES TO FACILITATE SECURE OPERATIONS", the entire of which is incorporated herein by reference.

TECHNICAL FIELD

The present disclosure relates generally to secure operations and, more particularly (although not necessarily exclusively), to providing dynamic access to service devices to facilitate secure operations between the service devices and user accounts.

BACKGROUND

A service provider can resolve service functions for users at a location associated with the service provider. For example, a user can wait in a queue at the location to have a service event resolved by authorized personnel. However, waiting in the queue can be time-consuming. Thus, it can be desirable to automate the service functions, such as by implementing service devices at the location associated with the service provider. The users can interact with the service devices, such as automated teller machines (ATMs), to cause the service devices to perform functions (e.g., the service functions). For example, the users can interact with the ATMs to cause the ATMs to withdraw funds, deposit funds, or perform other suitable service functions.

Additionally, there can be security concerns with automating the service functions. Current service devices can require that users input pin numbers or access cards to authenticate with the service device prior to the user requesting that the service device perform service functions. The pin numbers and access cards, however, may be stolen and may not be sufficient for authenticating the user. Therefore, there can be a need for improved security mechanisms for service devices.

SUMMARY

Dynamic access to service devices can be provided to facilitate secure transactions between the service devices and user accounts. For example, a system described herein can include an Internet of Things (IoT) service device associated with a service provider and a computing environment. The computing environment can be to control the IoT service devices by performing operations. The operations can include receiving an access request from an imaging device of the IoT service device. The access request can be transmitted in response to a mobile device displaying a contactless authentication code to the imaging device of the IoT service device. The operations may also include, in response to receiving the access request, determining that the contactless authentication code is valid for the IoT service device and identifying a user account associated with the contactless authentication code. Further, the operations can include, subsequent to validating the contactless authentication code for the IoT service device and identifying the user account, providing access for at least one function of the IoT service device via a software application associated with the service provider. The at least one function may be usable to facilitate a secure transaction between the IoT service device and the user account.

In an additional example, a computer-implemented method includes receiving an access request from an imaging device of the IoT service device. The access request can be transmitted in response to a mobile device displaying a contactless authentication code to the imaging device of the IoT service device. The method may also include, in response to receiving the access request, determining that the contactless authentication code is valid for the IoT service device and identifying a user account associated with the contactless authentication code. Further, the method can include, subsequent to validating the contactless authentication code for the IoT service device and identifying the user account, providing access for at least one function of the IoT service device via a software application associated with the service provider. The at least one function may be usable to facilitate a secure transaction between the IoT service device and the user account.

In an additional example, a non-transitory computer-readable medium can include instructions that are executable by a processing device for causing the processing device to perform operations. The operations can include receiving an access request from an imaging device of the IoT service device. The access request can be transmitted in response to a mobile device displaying a contactless authentication code to the imaging device of the IoT service device. The operations may also include, in response to receiving the access request, determining that the contactless authentication code is valid for the IoT service device and identifying a user account associated with the contactless authentication code. Further, the operations can include, subsequent to validating the contactless authentication code for the IoT service device and identifying the user account, providing access for at least one function of the IoT service device via a software application associated with the service provider. The at least one function may be usable to facilitate a secure transaction between the IoT service device and the user account.

DETAILED DESCRIPTION

Figure 1:
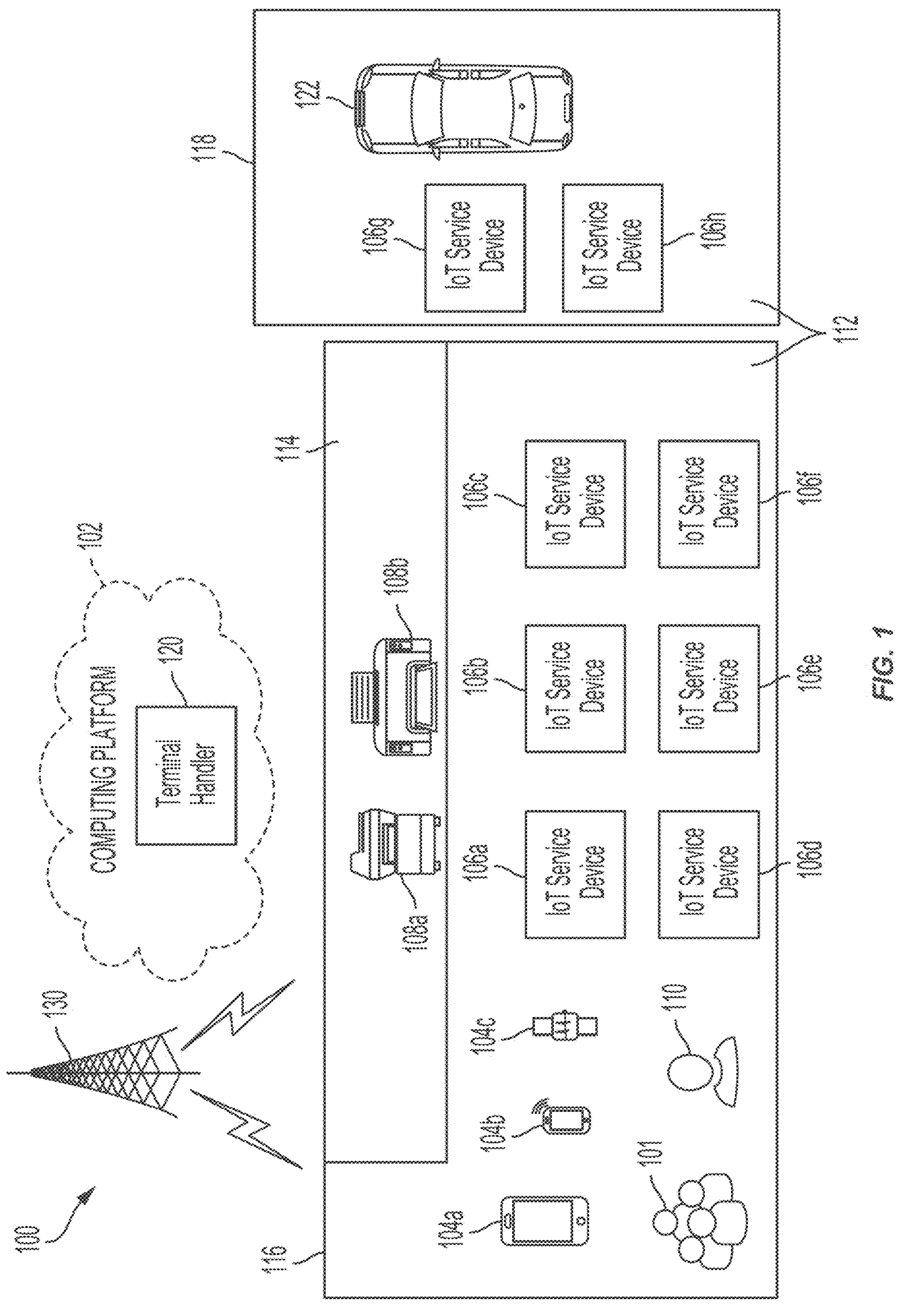
FIG. 1 is a schematic of an example of an Internet of Things (IoT) service device environment according to one example of the present disclosure.

Certain aspects and examples of the present disclosure relate to providing dynamic access to service devices to facilitate secure operations between the service devices and user accounts. In some examples, the service devices can be Internet of Things (IoT) service devices. Examples of service devices can include automated teller machines (ATMs), electronic funds transfer (EFT) terminals, teller cash recyclers (TCRs), check scanners, printers, or other suitable devices associated with a service provider (e.g., a financial institution). The IoT service devices can be service devices that are connected to a network, such as a local area network (LAN) or the internet. The IoT service devices can be in communication with a computing environment (e.g., an IoT computing platform), mobile devices, other service devices, other IoT devices, etc. via the network. For example, the IoT service devices can receive requests to perform functions, receive requests for data, transmit data, or otherwise communicate with the IoT computing platform, the mobile devices, the other service devices, the other IoT devices, etc. via the network. In an example, dynamic access to the service devices may be provided by generating dynamic authorization codes that include user configurations that define how the dynamic authorization codes can be used with the IoT service devices. For example, the dynamic authorization codes may include configurations that restrict times and locations in which the dynamic authorization code is valid for us in interacting with the IoT service devices.

In some examples, the IoT service devices can be situated within a location associated with the service provider (e.g., a branch of the financial institution) and the contactless access can be provided to mobile devices. In particular, the contactless access may be provided to mobile devices registered with user accounts associated with the service provider or that are running a software application associated with the service provider.

To provide the contactless access to the IoT service devices for the mobile devices, a contactless authentication process can be performed. The contactless authentication process can result in a mobile device transmitting an access request to the computing environment. In one example, the contactless authentication process can involve a mobile device of a user generating, via the mobile device, a contactless authentication code, such as a dynamic Quick Response (QR) code, associated with a user account and with user defined configurations that may restrict access to the user account through the IoT service device using the contactless access code. The contactless authentication code can function as the access request for the IoT service device, and an imaging device (e.g., a camera) of the IoT service device may scan the contactless access code to identify the user account and validate access to the user account.

In response to receiving the access request, the computing environment of the IoT service device may access a database with a mapping that relates each QR code to a corresponding user account. Thus, the computing environment may identify which user account is related to the access request based on the mapping. Further, the mapping may also relate the QR code with particular limitations associated with use of the QR code at the IoT service device. In some examples, the limitations may include time of access limitations or location limitations. Thus, the computing environment may identify whether the QR code is usable at a particular time at an IoT service device located in a particular location.

After the computing environment identifies the IoT device and the user account, the computing environment can provide access for the user of the mobile device to functions of the IoT service device via the IoT service device directly or via the software application associated with the service provider. In some examples, the computing environment can transmit a push notification to the mobile device, which can be selected by the user to open the software application. The software application can be linked to the user account and can provide options corresponding to functions of the IoT service device.

Accordingly, the mobile device or a user interaction component of the IoT service device can transmit requests for the IoT service device to perform one or more functions. For example, the mobile device may transmit a request as a result of the user selecting one of the options corresponding to one of the functions. The request can be for the IoT service device to perform the function as indicated by the selected option with respect to the user account. For example, the IoT service device can be an ATM and functions that can be performed via the ATM can include depositing funds, withdrawing funds, transferring funds, etc. Thus, the request can be for the ATM to transfer a certain amount of funds from the user account to a secondary account. For example, the user account can be a checking account belonging to the user and the secondary account may be a savings account belonging to the user. In response to receiving the request from the mobile device, the computing environment may cause the IoT service device to perform the function by, for example, transmitting an application programming interface (API) call to the IoT service device. In this way, the computing environment can facilitate a secure transaction between the user account and the IoT service device, in which the IoT service device transfers funds from the user account in a secure manner. In other examples, the secure transaction facilitated can include an IoT service device transmitting data to or from the user account, withdrawing funds from the user account, depositing funds to the user account, etc.

Examples of the present disclosure can overcome one or more technological problems via a computing environment that can provide secure access to IoT service devices. By providing the secure access, the computing environment can transfer control of an IoT service device from the IoT service device itself to a mobile device. As a result of the transfer of control, improved security measures can be implemented. For example, an access request may be transmitted by a mobile device in response to a user performing a contactless authentication process via the mobile device. The user may have authentication credentials (e.g., the pin number) for authenticating with the IoT service device. But, if, for example, the computing environment is unable to identify a user account based on the mobile device used to perform the contactless authentication process, the computing environment may detect a possible security breach. As a result, the computing environment may not provide access for the mobile device to the functions of the IoT service device. Additionally, due to transfer of control, the IoT service devices may not require screens or other suitable mechanisms for user interaction. As a result, interaction with the IoT service devices may only be possible, in some examples, via authenticated, registered, or otherwise verified mobile devices.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of an IoT service device environment 100 according to one example of the present disclosure. The IoT service device environment 100 can be a location associated with a service provider. For example, the service provider can be a financial institution and the IoT service device environment 100 can be a branch location associated with the financial institution. The IoT service device environment 100 may include an indoor area 116 and an outdoor area 118. The IoT service device environment 100 may further include user accessible areas 112 and user inaccessible areas 114. The user accessible areas 112 can be accessed by one or more users 101, authorized personnel 110, etc. Additionally, devices 104*a-c* and IoT service devices 106*a-h* can be located within the user accessible areas 112. The user inaccessible areas 114 can also be accessed by authorized personnel 110, but may not be accessed by users 101. In some examples, auxiliary devices 108*a-b* may be located in the user inaccessible areas 114 for use by the authorized personnel 110.

The devices 104*a-c* can include mobile device such as tablets 104*a*, smartphones 104*b*, smart watches 104*c*, or the like. The devices 104*a-c* can be associated with the user 101 such as by being registered with a user account belonging to the user 101. The devices 104*a-c* may also be associated with the authorized personnel 110, such as by being accessible via authorization credentials provided by the authorized personnel 110. The IoT service devices 106*a-h* can be devices for performing service functions. The service functions can be secure transactions performed with respect to a user account, such as a withdrawal of funds from the user account, an update to data associated with the user account, etc. Thus, the IoT service devices 106*a-h* can include automated teller machines (ATMs), electronic funds transfer (EFT) terminals, teller cash recyclers (TCRs), check scanners, or other suitable devices associated with a service provider (e.g., a financial institution) and capable of performing service functions. Additionally, the auxiliary devices 108*a-b* can include printers 108*b*, copiers 108*a*, or other suitable devices.

The IoT service device environment 100 may also include a computing platform 102. Examples of the computing platform 102 include a cloud computing platform or an Internet of Things (IoT) computing platform. The devices 104*a-c*, the IoT service devices 106*a-h*, and the computing platform 102 can be communicatively coupled via a network 130. The network 130 may correspond to a Wide Area Networks ("WANs"), such as the Internet. In other examples, the network 130 may be a mobile telecommunication network, a short-range wireless network, or the like. The devices 104*a-d* and the IoT service devices 106*a-h* may also communicate with servers, web browsers, or user-side applications via the network 130 to establish communication sessions, request and receive web-based resources, or access other suitable features of software applications or web services.

Additionally, in some examples, a terminal handler 120 can be operating on the computing platform 102 for communicating with devices 104*a-c*, controlling IoT service devices 106*a-h*, or a combination thereof. The terminal handler 120 can manage each of the IoT service devices 106*a-h*. In some examples, the terminal handler 120 may also manage the auxiliary devices 108*a-b*. The terminal handler 120 can receive requests from the devices 104*a-c*. The requests can be for an IoT service device to perform functions. For example, the IoT device may be an ATM and a request can be for the IoT service device to deposit a certain amount of funds into a user account. The terminal handler 120 may grant or deny requests based on an authentication process. Additionally, in some examples, the terminal handler 120 may initiate a step-up authentication protocol in response to the request. The step-up authentication protocol can include the terminal handler 120 transmitting a request for a user to perform an additional or more secure authentication process. In some examples, the terminal handler may also detect an issue with an IoT service device and may further notify the authorized personnel 110, technician specialists, or the like of the issue.

Although certain examples described herein relate to the use of mobile devices to access the IoT service device 106*a-h*, in other examples, the devices 104*a-c* may additionally or alternatively include non-mobile devices (e.g., desktop computers, laptop computers, and the like). The non-mobile devices can also be capable of communicating with or accessing any of the IoT service devices 106*a-h* via the network 130.

Additionally, although eight IoT service devices are depicted in FIG. 1, any number of IoT service devices can be found in the IoT service device environment 100. Moreover, as illustrated in FIG. 1, a first subset of the IoT service devices 106*a-f* can be indoor IoT service devices located in the indoor area 116 and a second subset of the IoT service devices 106*g-h* can be outdoor IoT service devices located in the outdoor area 118. In some examples, the outdoor IoT service devices (106*g* and 106*h*) can be accessible to a user within a user vehicle 122.

Figure 2:
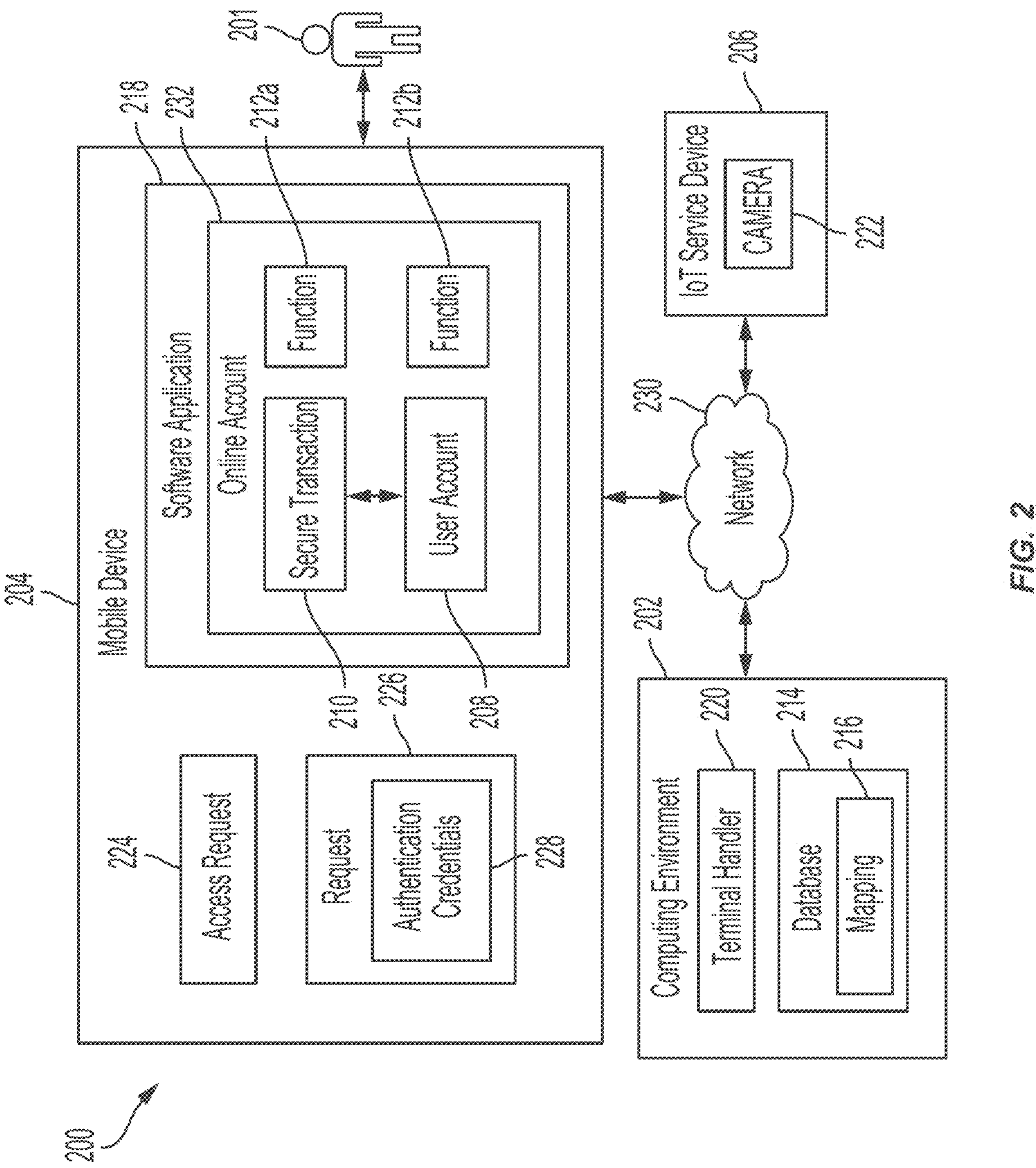
FIG. 2 is a block diagram of an example of a system for facilitating secure transactions between IoT service devices and user accounts according to one example of the present disclosure.

FIG. 2 is a block diagram of an example of a system 200 for facilitating secure transactions between service devices and user accounts according to one example of the present disclosure. The system 200 includes a computing environment 202. In some examples, the computing environment 202 may be a distributed computing environment, such as a cloud computing system, an IoT computing platform, or a computing cluster, formed from one or more nodes (e.g., physical or virtual servers) that are in communication with one another via a network 230. Additionally, in some examples, the computing environment 202 can correspond to the computing platform 102 of FIG. 1. The computing environment 202 can be in communication with a mobile device 204 and an IoT service device 206 via the network 230. Examples of the network 230 can include a local area network (LAN) or the Internet. The computing environment 202 can be formed from a physical infrastructure that includes various network hardware, such as routers, hubs, bridges, switches, and firewalls. The physical infrastructure can also include one or more servers. The servers may provide backend support for a software application 218 (e.g., a mobile application) or may provide a web interface for enabling a user 201 to interact with the IoT service device 206, a user account 208, or a combination thereof.

In an example, the user 201 may establish the user account 208 with a service provider. The user account 208 may be of any suitable type of account. For example, the service provider may be a bank and the user account 208 may be a deposit account. Separately from establishing the user account 208, the user 201 may register for an online account 232 with the service provider for use in monitoring and performing functions related to the underlying user account 208. The user 201 may then link the online account to the underlying user account 208 hosted by the service provider. The user 201 can also register the online account 232 with the mobile device 204. Examples of the mobile device can include a mobile phone, a laptop, a tablet, or a smart watch. Additionally, the online account 232 can be in communication with the IoT service device 206 such that the online account 232 can be used to access and control the IoT service device 206.

As a result of registering the online account 232 with the mobile device 204, the user 201 may obtain access to the online account 232 via the software application 218 executing on mobile device 204. For example, the user 201 may access the online account 232 via the mobile application or the web interface. In doing so, due to the online account 232 being in communication with the IoT service device 206, the user 201 can obtain access to functions 212*a-b* of the IoT service device 206.

For example, to obtain access to the functions 212*a-b*, the mobile device 204 may transmit an access request 224 to the computing environment 202. The mobile device 204 may transmit the access request 224 in response to the user 201 performing a contactless authentication process with the IoT service device 206. For example, the IoT service device 206 can be positioned within a location (e.g., IoT service device environment 100). The location of the IoT service device 206 may be a secure location controlled by or otherwise associated with the service provider. Additionally, the IoT service device 206 may be one of many IoT service devices within the location. For example, the IoT service device 206 may be an automated teller machine (ATM), and the location may also include one or more additional ATMs, electronic funds transfer (EFT) terminals, teller cash recyclers (TCRs), check scanners, printers, or other suitable types of IoT service devices associated with service provider. Each of the IoT service devices can include or be associated with a camera or other imaging device. For example, camera 222 can be included on or associated with IoT service device 206. Therefore, the user 201 may perform the contactless authentication process by generating a contactless authorization code, such as a QR code, for the camera 222 of the IoT service device 206 to scan as the access request 224.

In response to receiving the access request 224 from the mobile device 204, the computing environment 202 may identify a user account 208 associated with the mobile device 204 and with the service provider based on the contactless authorization code of the access request 224. For example, the user 201 may register the mobile device 204 with the user account 208, the online account 232, or a combination thereof. A database 214 can include a mapping 216 that relates the contactless authorization codes generated by mobile devices to corresponding user accounts based on the mobile devices being registered. Thus, the computing environment 202 may identify the user account 208 by accessing the database 214 and determining, based on the mapping 216, that the user account 208 is associated with the mobile device 204.

Subsequent to identifying the user account 208, the computing environment 202 can provide access for the mobile device 204 to functions 212*a-b* of the IoT service device 206 via the software application 218 associated with the service provider. Therefore, the contactless authentication process can result in a digital handshake between the mobile device 204 and the IoT service device 206. Due to the digital handshake (i.e., the access provided for the mobile device 204 to the functions 212*a-b* via the software application) the functions 212*a-b* can be used facilitate one or more secure transactions between the IoT service device 206 and the user account 208.

For example, after providing the access for the mobile device 204 to the functions 212*a-b*, the computing environment 202 may receive a request 226 for the IoT service device 206 to perform one or more of the functions 212*a-b*. For example, the request 226 can be for the IoT service device 206 to perform a first function 212*a*. In a particular example, the IoT service device 206 can be an ATM that is in communication with the computing environment 202 via the network 230 and the first function 212*a* can be for withdrawing funds from the user account 208. The request 226 can include an amount of funds to be withdrawn. The request 226 can also include the authentication credentials 228, which may be associated with the online account 232, the user account 208, the IoT service device 206, or a combination thereof.

In response to receiving the request 226, the computing environment 202 can authenticate the mobile device 204. The computing environment 202 may authenticate the user 201 of the mobile device 204. To authenticate the user 201, the computing environment 202 may verify that an authentication process was successful. For example, upon or prior to selecting one of the functions 212*a-b* via the software application 218, the user 201 may be prompted to provide the authentication credentials 228. The authentication credentials 228 can then be included in the request 226. In some examples, the authentication credentials 228 can be the contactless authentication code of the access request 224. In such an example, the access request 224 may be part of the request 226 used in the authentication process. Thus, verifying that the authentication process was successful may include the computing environment 202 verifying that the authentication credentials 228 (e.g., the contactless authentication code, other authentication credentials, or a combination thereof) are valid for authenticating with the online account 232, the user account 208, the IoT service device 206, or a combination thereof.

Additionally, to authenticate the mobile device 204, the computing environment 202 can identify a particular location and a particular time in which the contactless authentication code is valid. For example, the contactless authentication code can be generated in a manner that limits valid locations and time periods in which the contactless authentication code is valid. That is, a user of the mobile device 204 can set security features that limit valid locations geographically (e.g., based on proximity to home or work, or based on locations of specifically identified IoT service devices 206) and that limit valid periods of time where the contactless authentication code can be used to access the IoT service devices 206 (e.g., within a certain amount of time of generating the contactless authorization code or at a specific time of day). Additionally, the computing environment 202 can determine that the mobile device 204 is proximate to the IoT service device 206. For example, the computing environment 202 may detect a location of the mobile device 204, such as by accessing location services of the mobile device 204. Then, the computing environment 202 may determine a distance between the location of the mobile device 204 and a location of the IoT service device 206. The computing environment 202 may further determine that the distance is less than a threshold distance to authenticate the mobile device 204. In additional examples, the computing environment 202 may authenticate the mobile device 204 by verifying that the mobile device 204 is a registered device for the online account 232 or the user account 208. For example, the computing environment 202 can access the database 214 to verify that the request 226 was received from the registered mobile device for the user account 208.

After authenticating the user 201 and the mobile device 204, the computing environment 202 can transmit an application programming interface (API) call or otherwise communicate with the IoT service device 206 to cause the IoT service device to perform the first function 212*a*. In the example, the API used by the computing environment 202 can be an extension for financial services (XFS). In particular, the API can be XFS4. Therefore, the computing environment 202 can communicate with and cause the IoT service device 206 to perform the first function 212*a* by transmitting the API call via the API (e.g., the XFS4). In this way, the computing environment 202 can automatically cause the IoT service device 206 to perform the first function 212*a* in response to the request 226. Additionally, by performing the first function 212*a*, the IoT service device 206 can cause a secure transaction 210 between the IoT service device 206 and the user account 208, such as a withdrawal of the amount of funds from the user account 208 as indicated in the request 226. Further, in some examples, the authentication process may provide the user 201 with direct access to a touchscreen of the IoT service device 206 to instruct the IoT service device 206 to perform one or more functions 212*a* or 212*b*.

In an example, the computing environment 202 may detect an issue with the access request 224 or the request 226. The issue may include the authentication credentials 228 being invalid, the mobile device 204 not being the registered mobile device for the user account 208, the mobile device 204 not being included in the second database 214*b*, the computing environment 202 being unable to detect the proximity of the mobile device 204 to the IoT service device 206, etc. In response to detecting the issue, the computing environment 202 may transmit a notification of the issue to the second mobile device.

Additionally, in some examples, the computing environment 202 can include a terminal handler 220 for connecting, monitoring, and maintaining the system 200. The terminal handler 220 can manage interactions between the computing environment 202, the IoT service device 206, and the mobile device 204. For example, the terminal handler 220 can permit the mobile device 204 to access the functions 212*a-b* via the software application 218 in response to the access request 224. The terminal handler 220 may also authenticate the user 201, authenticate the mobile device 204, or transmit the API call in response to the request 226. Additionally, the terminal handler 220 may be able to monitor the IoT service device 206. For example, the terminal handler 220 may monitor cash levels of the ATM.

Figure 3:
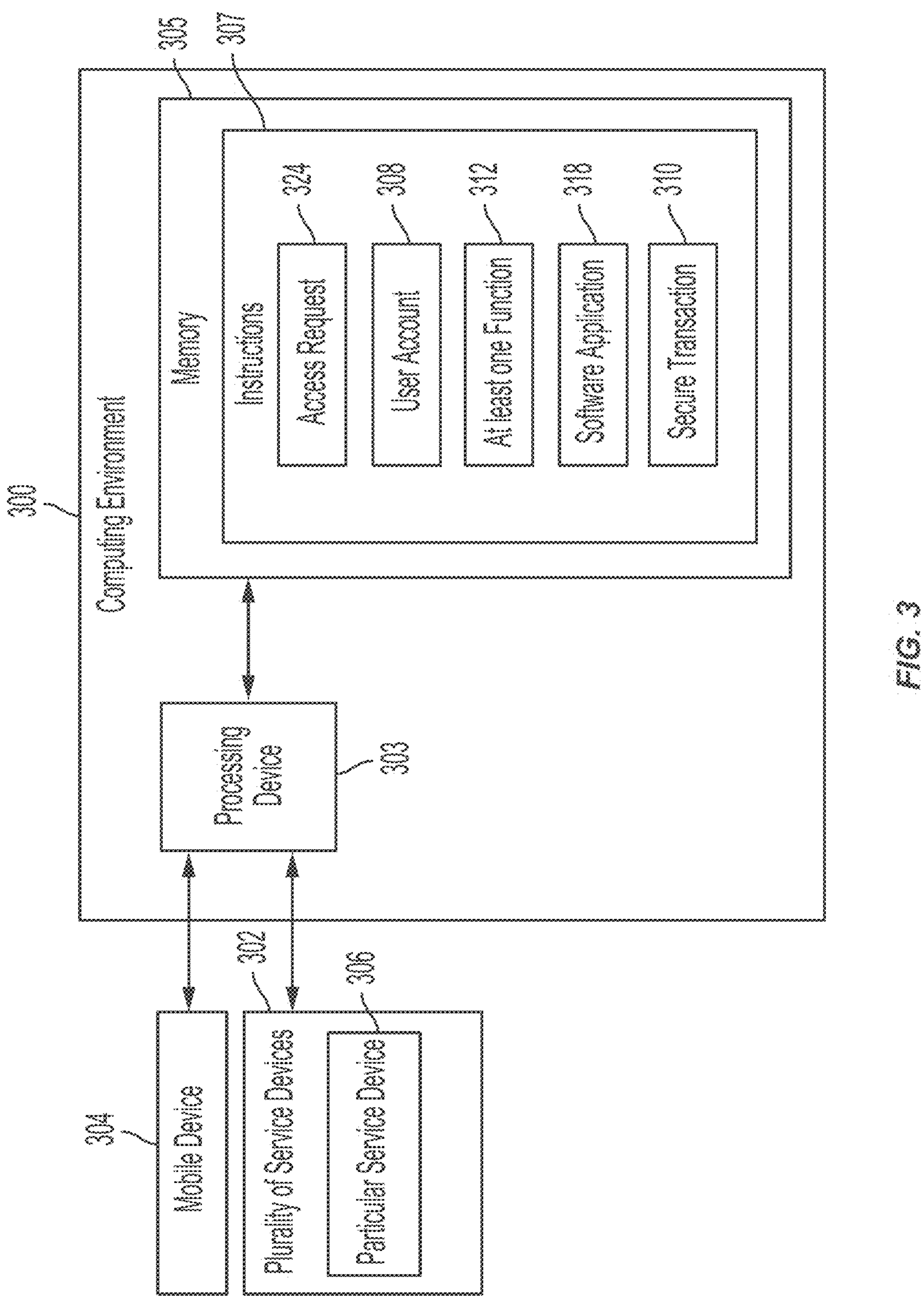
FIG. 3 is a block diagram of an example of a computing environment for facilitating secure transactions between IoT service devices and user accounts according to one example of the present disclosure.

FIG. 3 is a block diagram of an example of a computing environment 300 for facilitating secure transactions between service devices and user accounts according to one example of the present disclosure. The components shown in FIG. 3, such as the processing device 303, the memory 305, and the like, may be integrated into a single structure such as within the single housing of the computing environment 300. Alternatively, the components shown in FIG. 3 can be distributed from one another and in electrical communication with each other.

As shown, the computing environment 300 includes the processing device 303 communicatively coupled to the memory 305. The processing device 303 can include one processor or multiple processors. Non-limiting examples of the processing device 303 include a Field-Programmable Gate Array (FPGA), an application specific integrated circuit (ASIC), a microprocessor, or any combination of these. The processing device 303 can execute instructions 307 stored in the memory 305 to perform operations. In some examples, the instructions 307 can include processor-specific instructions generated by a compiler or an interpreter from code written in any suitable computer-programming language, such as C, C++, C #, Python, or Java.

The memory 305 can include one memory device or multiple memory devices. The memory 305 can be non-volatile and may include any type of memory device that retains stored information when powered off. Non-limiting examples of the memory 305 include electrically erasable and programmable read-only memory (EEPROM), flash memory, or any other type of non-volatile memory. At least some of the memory 305 can include a non-transitory computer-readable medium from which the processing device 303 can read instructions 307. The non-transitory computer-readable medium can include electronic, optical, magnetic, or other storage devices capable of providing the processing device 303 with the instructions 307 or other program code. Non-limiting examples of the non-transitory computer-readable medium include magnetic disk(s), memory chip(s), RAM, an ASIC, or any other medium from which a computer processor can read instructions 307.

The processing device 303 can execute the instructions 307 to perform operations. For example, the processing device 303 can receive an access request 324 from a mobile device 304. The access request 324 can be transmitted by a user of the mobile device 304 performing a contactless authentication process with a particular IoT service device 306 of a plurality IoT service devices 302. The plurality of IoT service devices 302 can be associated with a service provider. In response to receiving the access request 324, the processing device 303 can identify a user account 308 associated with the mobile device 304 and with the service provider. Subsequent to identifying the user account 308, the processing device 303 can provide access for the mobile device 304 to at least one function 312 of the particular IoT service device 306 via a software application 318 associated with the service provider. The at least one function 312 can be used to facilitate a secure transaction 310 between the particular IoT service device 306 and the user account 308. In an additional example, the processing device 303 can provide access to the user of the mobile device 304 to at least one function 312 of the IoT service device 306 through a touchscreen or other input/output component of the IoT service device 306.

Figure 4:
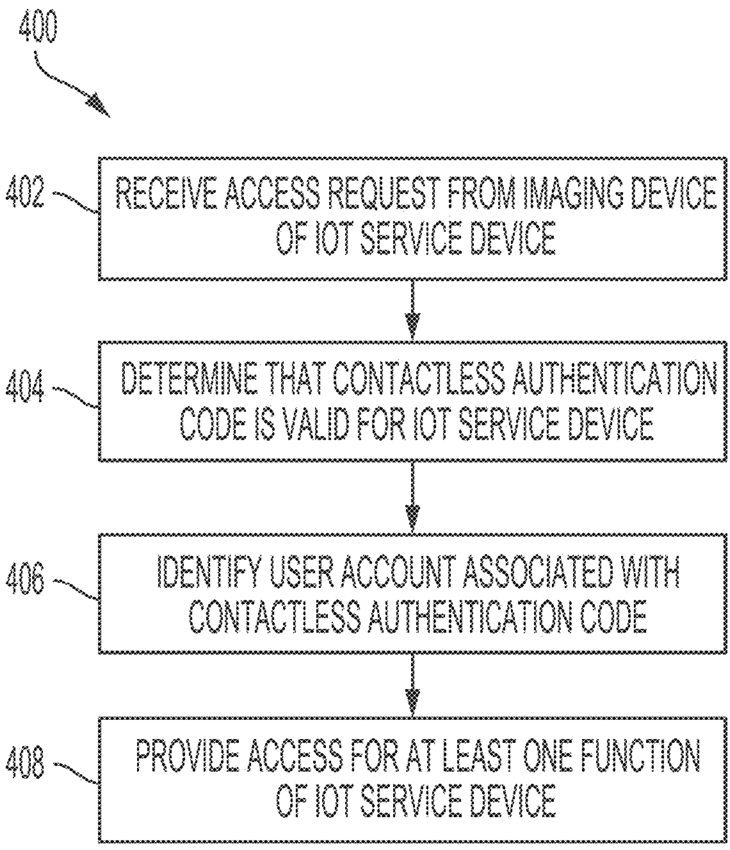
FIG. 4 is a flowchart of a process for facilitating secure transactions between IoT service devices and user accounts according to one example of the present disclosure.

FIG. 4 is a flow chart of a process 400 for facilitating secure transactions between service devices and user accounts according to one example of the present disclosure. The process 400 of FIG. 4 can be implemented by the terminal handler 120 of FIG. 1, the computing environment 202 of FIG. 2, or the processing device 303 of FIG. 3, but other implementations are also possible. While FIG. 4 depicts a certain sequence of steps for illustrative purposes, other examples can involve more steps, fewer steps, different steps, or a different order of the steps depicted in FIG. 4. The steps of FIG. 4 are described below with reference to the components of FIGS. 1-3 described above.

At block 402, the processing device 303 can receive an access request 224 from an imaging device of an IoT service device 306. The access request 224 can include a contactless authorization code, such as a dynamic QR code, generated by a mobile device 304 of a user. The contactless authorization code may be scanned by the imaging device, such as the camera 222, of the IoT service device 306. In some examples, the contactless authorization code may be generated by the mobile device 304 in response to a user of the mobile device 304 performing a contactless authentication process with the IoT service device 306. The IoT service device 306 can be positioned in a location associated with a service provider, such as the IoT service device environment 100 depicted in FIG. 1.

At block 404, the processing device 303 can determine that the contactless authentication code is valid for the IoT service device 306. In some examples, the contactless authentication code includes a dynamic QR code generated on the mobile device 304. The dynamic QR code may be updated in a manner that establishes limitations on the contactless authentication code. In some examples, the dynamic QR code is associated with user account information of the user account. The limitations may include identification of a particular location and a particular time in which the QR code is valid. For example, validating the contactless authentication code may involve determining that the IoT service device 306 is located at the particular location associated with the QR code and determining that the access request was generated during a particular time associated with the QR code.

In an additional example, the processing device can authenticate a user of the mobile device 304 based on the authentication credentials, such as the contactless authentication code, and based on a distance between a location of the mobile device 304 and a location of the IoT service device 306 being less than a threshold distance. For example, the contactless authentication code may only be valid when the mobile device 304 is determined to be within 10 feet of the IoT service device 306. Other threshold distances may also be used.

At block 406, the processing device 303 can identify a user account associated with the contactless authentication code. For example, the computing environment 202 may map the contactless authentication code to a mapping 216 in the database 214 to determine the user account associated with the contactless authentication code.

At block 408, the processing device 303 can provide access for at least one function of the IoT service device 306. In an example, the at least one function is usable to facilitate a secure transaction between the IoT service device and the user account. For example, the IoT service device 306 can be an ATM and functions that can be performed via the ATM once the contactless authentication code is validated can include depositing funds, withdrawing funds, transferring funds, etc.

Subsequent to providing access for the at least one function of the IoT service device 306, the processing device 303 may receive a request for the IoT service device 306 to perform the at least one function. The request may be authenticated by the processing device, and the processing device 303 may transmit an application programming interface (API) call to the IoT service device 306 to cause the IoT service device 306 to perform the at least one function to facilitate the secure transaction between the IoT service device 306 and the user account.

Figure 5:
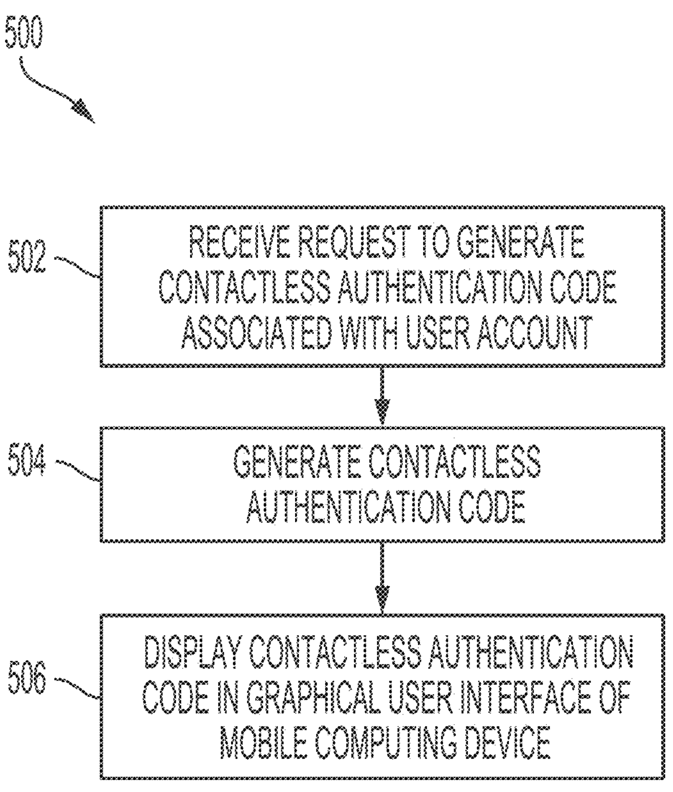
FIG. 5 is a flowchart of a process for generating a contactless authorization code for accessing functions of the IoT service devices according to one example of the present disclosure.

FIG. 5 is a flow chart of a process 500 for generating a contactless authorization code for accessing functions of the IoT service devices according to one example of the present disclosure. The process 500 of FIG. 5 can be implemented by the terminal handler 120 of FIG. 1, the computing environment 202 of FIG. 2, or the processing device 303 of FIG. 3, but other implementations are also possible. While FIG. 5 depicts a certain sequence of steps for illustrative purposes, other examples can involve more steps, fewer steps, different steps, or a different order of the steps depicted in FIG. 5. The steps of FIG. 5 are described below with reference to the components of FIGS. 1-3 described above.

At block 502, the processing device 303 may receive a request to generate a contactless authentication code associated with a user account. The contactless authentication code may be a dynamic QR code used to access functions of an Internet of Things (IoT) service device 306 associated with the user account. In some examples, the request to generate the contactless authentication code may also include restrictions on where and when the contactless authentication code is valid at the IoT service device 306.

At block 504, the processing device 303 may generate the contactless authentication code used to access the functions of the IoT service device associated with the user account. In some examples, the contactless authentication code may be encoded with information relating to the user account and the restrictions on the validity of the contactless authentication code. For example, a mobile device 304 generating the contactless authentication code may map the user account to the contactless authentication code and the validity limitations in the database 214 using the mapping 216. Further, the restrictions on the validity of the contactless authentication code may include a particular location and a particular time in which the contactless authentication code is valid.

At block 506, the processing device 303 may display the contactless authentication code in a graphical user interface of the mobile device 304. In an example, the contactless authentication code can be captured by an imaging device of the IoT service device 306 to validate access by a user of the mobile device 304 to access the functions of the IoT service device 306 associated with the user account. Accessing the functions of the IoT service device 306 may facilitate a secure transaction between the IoT service device 306 and the user account. In some examples, the contactless authentication code may be printed or displayed on a device other than the mobile device 304 for scanning and validation by the IoT service device 306.

In some examples, the processing device 303 may transmit geolocation information of the mobile device 304 to a computing environment 202 of the IoT service device 306 to verify that the mobile device 304 is within a threshold distance of the IoT service device 306 prior to receiving access to the functions of the IoT service device 306. Further, upon validating the access of the mobile device 304 to the IoT service device 306, the mobile device 304 may transmit instructions to the IoT service device 306 to control the functions of the IoT service device 306.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processor; and a non-transitory computer-readable medium comprising instructions that are executable by a processing device for causing the processing device to perform operations comprising:

prior to generating a contactless authentication code, requiring a successful biometric authentication or multi-factor authentication of a user at a mobile computing device;

determining, based on geolocation data, that the mobile computing device is within a predetermined physical distance of an Internet of Things (IoT) service device;

receiving, in response to determining that the mobile computing device is within the predetermined physical distance of the IoT service device, a request to generate a contactless authentication code associated with a user account, the contactless authentication code used to access functions of the IoT service device associated with the user account, wherein the contactless authentication code comprises a dynamic Quick Response (QR) code configured to be displayed on the mobile computing device, wherein the dynamic QR code encodes (i) user account information (ii) an interaction type of an interaction associated with the request, (iii) an interaction amount of the interaction, and (iv) a unique identifier associated with the IoT service device such that the dynamic QR code is only valid for the interaction and the IoT service device;

generating a first mapping that maps the user account with a first version of the dynamic QR code, wherein the first mapping defines a one-to-one correspondence between the user account and the first version of the dynamic QR code;

generating the contactless authentication code used to access the functions of the IoT service device associated with the user account;

displaying the contactless authentication code in a graphical user interface of the mobile computing device, the contactless authentication code configured to be captured by an imaging device of the IoT service device to validate access by a user of the mobile computing device to the functions of the IoT service device associated with the user account to facilitate a secure transaction between the IoT service device and the user account, wherein, upon the imaging device of the IoT service device capturing the dynamic QR code, the IoT service device is configured to transmit the dynamic QR code to a remote server for real-time validation to invalidate the dynamic QR code after a single use or after a predetermined time interval; and one of the following:

in response to determining that the access by the user of the mobile computing device to the functions of the IoT service device is valid based on the first mapping being valid, facilitating performance of the functions of the IoT service device; or in response to determining that the access by the user of the mobile computing device to the functions of the IoT service device is not valid based on the first mapping not being valid, preventing performance of the functions of the IoT service device.

2. The system of claim 1, wherein the dynamic QR code is associated with user account information of the user account.

3. The system of claim 2, wherein the dynamic QR code is dynamically generated to identify a particular location and a particular time in which the QR code is valid.

4. The system of claim 1, wherein generating the contactless authentication code comprises:

assigning the contactless authentication code a particular location and a particular time in which the contactless authentication code is valid using input of a user at the mobile computing device.

5. The system of claim 1, further comprising:

transmitting geolocation information of the mobile computing device to a computing environment of the IoT service device to verify that the mobile computing device is within a threshold distance of the IoT service device prior to receiving access to the functions of the IoT service device.

6. The system of claim 1, further comprising:

transmitting instructions to the IoT service device to control the functions of the IoT service device.

7. The system of claim 1, wherein the dynamic QR code comprises a one-time-use cryptographic token, wherein the remote server is configured to maintain a registry of issued tokens, wherein, upon validation of the cryptographic token for an interaction, the remote server is configured to mark the cryptographic token as used and to reject subsequent attempts to use the cryptographic token, and wherein, prior to enabling the function of the IoT service device, the IoT service device is configured to further verify a presence of the user by detecting a proximate near-field communication (NFC) signal emitted by the mobile computing device.

8. The system of claim 1, wherein, after the IoT service device receives a validation result from the remote server, the system is configured to (i) transmit a real-time notification to the mobile computing device indicating whether access was granted or denied in response to an access attempt, (ii) to log the access attempt in an audit trail associated with the user account, and (iii) upon successful completion of the secure transaction, to generate and transmit to the mobile computing device an electronic receipt comprising transaction details, a timestamp, an identifier of the IoT service device, and an indication of an outcome of the transaction.

9. A computer-implemented method comprising:

prior to generating a contactless authentication code, requiring a successful biometric authentication or multi-factor authentication of a user at a mobile computing device;

determining, based on geolocation data, that the mobile computing device is within a predetermined physical distance of an Internet of Things (IoT) service device;

receiving, in response to determining that the mobile computing device is within the predetermined physical distance of the IoT service device, a request to generate a contactless authentication code associated with a user account, the contactless authentication code used to access functions of the IoT service device associated with the user account, wherein the contactless authentication code comprises a dynamic Quick Response (QR) code configured to be displayed on the mobile computing device, wherein the dynamic QR code encodes (i) user account information (ii) an interaction type of an interaction associated with the request, (iii) an interaction amount of the interaction, and (iv) a unique identifier associated with the IoT service device such that the dynamic QR code is only valid for the interaction and the IoT service device;

generating a first mapping that maps the user account with a first version of the dynamic QR code, wherein the first mapping defines a one-to-one correspondence between the user account and the first version of the dynamic QR code;

generating the contactless authentication code used to access the functions of the IoT service device associated with the user account;

displaying the contactless authentication code in a graphical user interface of the mobile computing device, the contactless authentication code configured to be captured by an imaging device of the IoT service device to validate access by a user of the mobile computing device to the functions of the IoT service device associated with the user account to facilitate a secure transaction between the IoT service device and the user account, wherein, upon the imaging device of the IoT service device capturing the dynamic QR code, the IoT service device is configured to transmit the dynamic QR code to a remote server for real-time validation to invalidate the dynamic QR code after a single use or after a predetermined time interval; and one of the following:

in response to determining that the access by the user of the mobile computing device to the functions of the IoT service device is valid based on the first mapping being valid, facilitating performance of the functions of the IoT service device; or in response to determining that the access by the user of the mobile computing device to the functions of the IoT service device is not valid based on the first mapping not being valid, preventing performance of the functions of the IoT service device.

10. The computer-implemented method of claim 9, wherein the dynamic QR code is associated with user account information of the user account.

11. The computer-implemented method of claim 10, wherein the dynamic QR code is dynamically generated to identify a particular location and a particular time in which the QR code is valid.

12. The computer-implemented method of claim 9, wherein generating the contactless authentication code comprises:

assigning the contactless authentication code a particular location and a particular time in which the contactless authentication code is valid using input of a user at the mobile computing device.

13. The computer-implemented method of claim 9, further comprising:

transmitting geolocation information of the mobile computing device to a computing environment of the IoT service device to verify that the mobile computing device is within a threshold distance of the IoT service device prior to receiving access to the functions of the IoT service device.

14. The computer-implemented method of claim 9, further comprising:

transmitting instructions to the IoT service device to control the functions of the IoT service device.

15. A non-transitory computer-readable medium comprising instructions that are executable by a processing device for causing the processing device to perform operations comprising:

prior to generating a contactless authentication code, requiring a successful biometric authentication or multi-factor authentication of a user at a mobile computing device;

determining, based on geolocation data, that the mobile computing device is within a predetermined physical distance of an Internet of Things (IoT) service device;

receiving, in response to determining that the mobile computing device is within the predetermined physical distance of the IoT service device, a request to generate a contactless authentication code associated with a user account, the contactless authentication code used to access functions of the IoT service device associated with the user account, wherein the contactless authentication code comprises a dynamic Quick Response (QR) code configured to be displayed on the mobile computing device, wherein the dynamic QR code encodes (i) user account information (ii) an interaction type of an interaction associated with the request, (iii) an interaction amount of the interaction, and (iv) a unique identifier associated with the IoT service device such that the dynamic QR code is only valid for the interaction and the IoT service device;

generating a first mapping that maps the user account with a first version of the dynamic QR code, wherein the first mapping defines a one-to-one correspondence between the user account and the first version of the dynamic QR code;

generating the contactless authentication code used to access the functions of the IoT service device associated with the user account;

displaying the contactless authentication code in a graphical user interface of the mobile computing device, the contactless authentication code configured to be captured by an imaging device of the IoT service device to validate access by a user of the mobile computing device to the functions of the IoT service device associated with the user account to facilitate a secure transaction between the IoT service device and the user account, wherein, upon the imaging device of the IoT service device capturing the dynamic QR code, the IoT service device is configured to transmit the dynamic QR code to a remote server for real-time validation to invalidate the dynamic QR code after a single use or after a predetermined time interval; and one of the following:

in response to determining that the access by the user of the mobile computing device to the functions of the IoT service device is valid based on the first mapping being valid, facilitating performance of the functions of the IoT service device; or in response to determining that the access by the user of the mobile computing device to the functions of the IoT service device is not valid based on the first mapping not being valid, preventing performance of the functions of the IoT service device.

16. The non-transitory computer-readable medium of claim 15, wherein the dynamic QR code is associated with user account information of the user account.

17. The non-transitory computer-readable medium of claim 16, wherein the dynamic QR code is dynamically generated to identify a particular location and a particular time in which the QR code is valid.

18. The non-transitory computer-readable medium of claim 15, wherein generating the contactless authentication code comprises:

assigning the contactless authentication code a particular location and a particular time in which the contactless authentication code is valid using input of a user at the mobile computing device.

19. The non-transitory computer-readable medium of claim 15, further comprising:

transmitting geolocation information of the mobile computing device to a computing environment of the IoT service device to verify that the mobile computing device is within a threshold distance of the IoT service device prior to receiving access to the functions of the IoT service device.

* * * * *